Nov. 1, 1927.　　　　　F. A. JIMERSON　　　　　1,647,230
CRANK SHAFT
Filed March 12, 1927

INVENTOR.
Francis A. Jimerson.
BY Herbert G. Ogden
HIS ATTORNEY

Patented Nov. 1, 1927.

1,647,230

UNITED STATES PATENT OFFICE.

FRANCIS A. JIMERSON, OF ATHENS, PENNSYLVANIA, ASSIGNOR TO INGERSOLL-RAND COMPANY, OF JERSEY CITY, NEW JERSEY, A CORPORATION OF NEW JERSEY.

CRANK SHAFT.

Application filed March 12, 1927. Serial No. 174,800.

This invention relates to motors, but more particularly to a crank shaft for multi-cylinder motors.

The objects of the invention are to facilitate the assembly of the crank shaft in the motor and to reduce the cost of manufacturing and the expense of maintaining crank shafts of the type in which a plurality of pistons are connected to and radiate from the same crank pin.

Other objects will be in part obvious and in part pointed out hereinafter.

Figure 1:
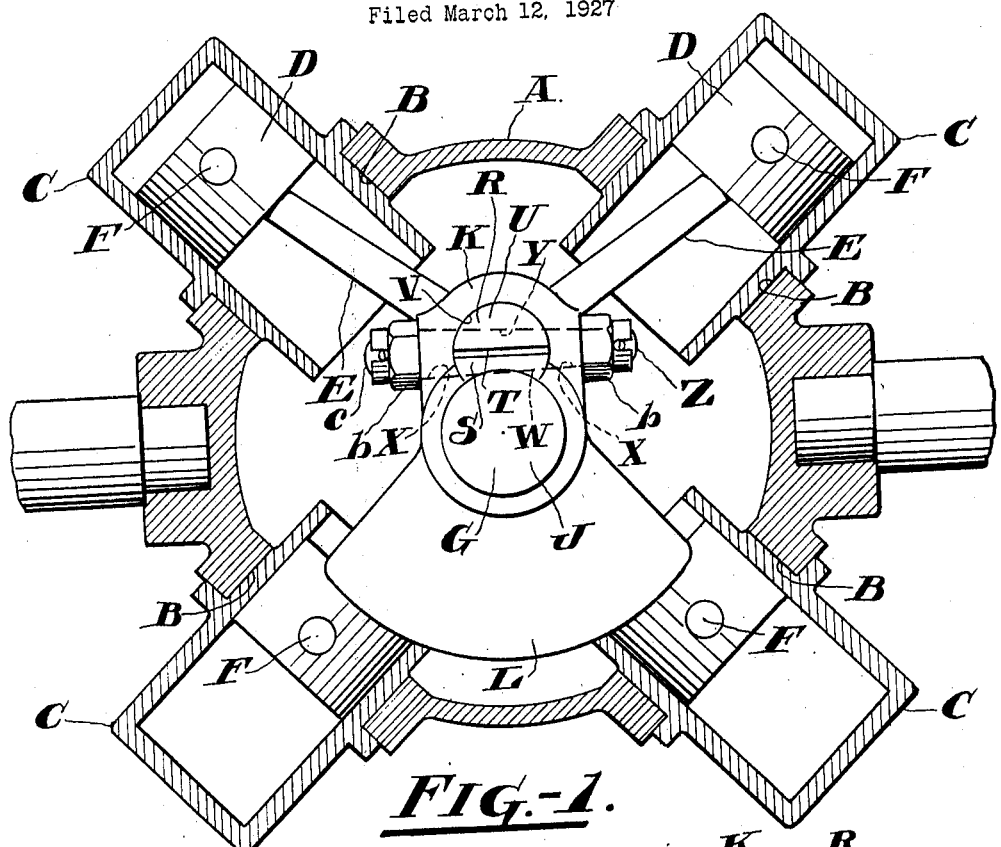
Figures 2, 3:
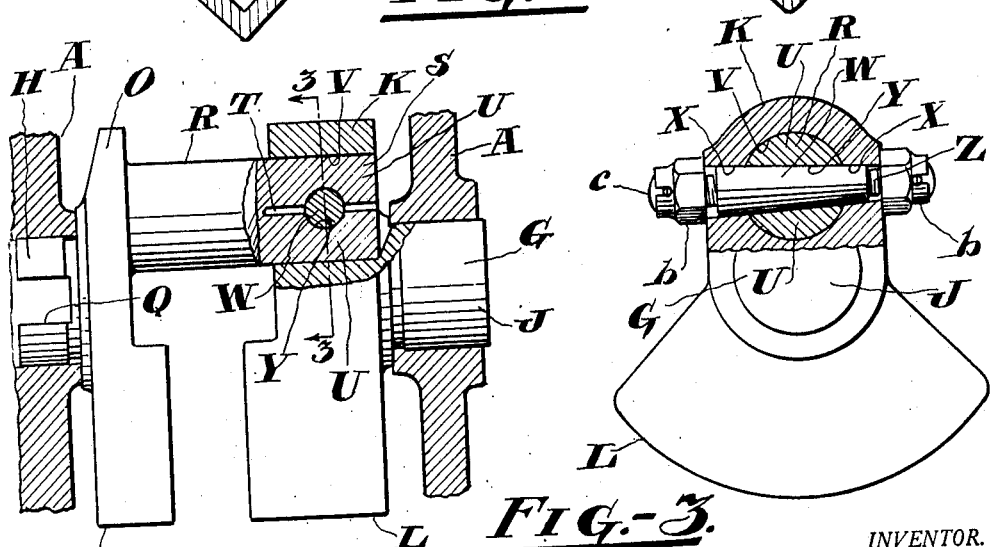

The invention consists of the combination of elements, features of construction and arrangement of parts substantially as hereinafter described and claimed and illustrated in the accompanying drawings, in which Figure 1 is a transverse sectional elevation of a multi-cylinder motor equipped with a crank shaft constructed in accordance with the practice of the invention, Figure 2 is a side elevation of the crank shaft partly in section, and Figure 3 is an end elevation of the crank shaft partly broken away to illustrate the manner in which the parts comprising the crank shaft are connected together.

Referring to the drawings the invention is shown embodied in a motor comprising a casing A having a plurality of radial apertures B in which are disposed cylinders C. The cylinders C are preferably equi-distant with respect to each other and are provided with suitable pistons D to which are secured connecting rods E by the usual wrist pins F.

Supported by the casing A is a crank shaft designated generally by G to which the connecting rods E may be secured in any suitable manner. The crank shaft G in the present instance comprises a pair of shaft members H and J which are adapted to rotate in the casing A. In the construction shown, the shaft J is provided with an integral crank web K as well as an integral counterweight L. In like manner the shaft H has an integral crank web O and counterweight P. Preferably a slot Q is formed in the shaft H to engage a tang of a working implement (not shown) such as a drill bit or wrench.

In the present instance a crank pin R is carried by the crank web O and is split longitudinally at its free end S, that is, a longitudinal slot T is formed in the free end of the crank pin to divide it into a pair of semi-cylindrical portions U. The slot T is preferably of a length somewhat in excess of the width of the crank web K so that the portions U may be readily separated or expanded in a bore V formed in the crank web K into which bore the end of the crank pin R extends.

Suitable and convenient means are provided for obtaining expansion or spreading of the portions U of the crank pin to press said portions firmly into contact with the wall of the bore V. This is accomplished in the present instance by inserting a tapered pin W in suitably tapered apertures X and Y formed transversely through the crank pin R and the crank web K respectively. The apertures X and Y are of course so formed that when the parts comprising the crank shaft are in their relative positions, said apertures register with each other. With respect to the crank pin, however, these apertures are preferably so formed that their axes will lie approximately mid-way between the semi-cylindrical portions U of the crank pin.

For simplicity of illustration, the tapered pin W is shown as being round or of conical form. The invention, however, is not limited to this precise showing and it is to be understood that any suitable means which will produce the expansive effect in the end of the crank pin R may be substituted for the pin shown.

In order to enable the pin W to be drawn tightly into position in the crank pin and the crank web, the pin is provided at its small end with a reduced threaded portion Z to receive a nut $b$ which bears against the side of the crank web K for drawing the pin W into the apertures. Similarly, at the opposite end of the pin W is formed a threaded projection $c$ to receive a nut $b$ which bears against the opposite side of the crank web K for withdrawing the pin W from the apertures X and Y.

In assembling the device the crank pin R is placed in the bore V of the crank web K and is so positioned with respect to the apertures X in the crank web that the aperture Y will coincide with the said apertures X. The pin W may then be inserted in the apertures and the nut $b$ screwed on the tapered portion Z. The pin W may thus be drawn firmly into the apertures X and Y to align the shafts H and J and to press the portions U firmly against the wall of the bore V.

Whenever it is desired to disassemble the crank shaft, the nut on the threaded portion Z may be removed and by turing the nut $b$ on the threaded portion $c$ in the proper direction, the pin W may be readily withdraw from the aperture without injury to any portion of the pin or the crank pin and web.

The nuts $b$ are preferably at all times drawn tightly against the sides of the crank web K so that the pin W and the elements which it secures will be held immovable with respect to each other.

By means of the present invention the parts comprising the crank shaft are capable of being handled with greater ease and may therefore be manufactured more cheaply than is the case in the machining of crank shafts in which the various elements comprising the crank shaft are formed of a single piece.

When a tapered pin W is employed for fastening together the crank and crank pin, the continual wrenching of the shaft is apt to cause a slight wearing and loosening of the pin, either in the tapered hole Y of the crank pin W or the tapered aperture X of the crank K. As soon as this occurs, the nut $b$ at the smaller end of the pin W becomes loosened and is apt to come off and cause damage to the moving parts of the motor. The nut $b$ at the opposite end of the pin W is provided to prevent the accidental removal of the nut at the smaller end. Tightening up of these nuts $b$ holds the pin W rigidly with respect to the crank K regardless of wear in the tapered holes of the crank or crank pin. Furthermore, the nut $b$ at the larger end of the pin W is useful in withdrawing the pin after the nut $b$ at the opposite end has been loosened.

I claim:

A crank shaft comprising a pair of shafts, crank webs on the shafts, one of said crank webs having a bore and transverse tapered apertures, a crank pin integral with the other crank web extending into the bore, a longitudinal slot in the crank pin dividing the free end thereof into a pair of semi-cylindrical portions, a tapered aperture transversely through the crank pin and crank web, the longitudinal axis of the last said aperture lying between the portions, a tapered pin in said apertures adapted to force said portions firmly against the wall of the bore to connect the shafts, threaded ends on the tapered pin, a nut on the smaller end of the pin for drawing said pin into the tapered aperture, and a nut on the larger end of the pin for holding said pin rigid with respect to one of said crank webs and to assist in removing said pin.

In testimony whereof I have signed this specification.

FRANCIS A. JIMERSON.